UNITED STATES PATENT OFFICE.

ST. CLAIR F. SUTHERLAND, OF BALTIMORE, MARYLAND.

IMPROVEMENT IN PROCESSES FOR TREATING LAMP-WICKS.

Specification forming part of Letters Patent No. 135,252, dated January 28, 1873.

*To all whom it may concern:*

Be it known that I, ST. CLAIR F. SUTHERLAND, of the city of Baltimore, State of Maryland, have invented a new and useful Improvement in Lamp-Wicks, so as to render them indestructible from the action of the flame, and without interfering with capillary attraction, preventing the necessity, consequently, of the repeated trimming and renewing, as now with the unprepared wick, and thus securing durability, economy, and labor saving, of which the following is a specification:

The materials used by me in carrying out my invention are pulverized asbestus and the silicate of soda or potash, (liquid glass,) and my mode of applying same to the wick is as follows: The pulverized asbestus being mixed with water to the consistency of whitewash, into this mixture, while boiling, I subject the end of the wick for a sufficient time to allow the fiber of the cotton (or other material of which it is woven) to be covered by the mineral; it is then dried and a coating of diluted silicate of soda or potash is applied to it so as to fix the asbestus; when again dry it is treated to one or more coats of silicate of soda or potash put on with a brush and finished off with bronze.

Having thus described my invention, I claim—

Lamp-wicks prepared by the successive application thereto of asbestus and silicates of soda or potassa, as and for the purpose specified.

ST. CLAIR F. SUTHERLAND.

Witnesses:
    ADAM NEWS,
    EDW. T. GEGAN.